United States Patent [19]

Maffet

[11] 4,244,287
[45] * Jan. 13, 1981

[54] TWO-STAGE MECHANICAL DEWATERING OF SEWAGE SLUDGE

[75] Inventor: Vere Maffet, West Chester, Pa.

[73] Assignee: UOP Inc., Des Plaines, Ill.

[*] Notice: The portion of the term of this patent subsequent to Jul. 10, 1996, has been disclaimed.

[21] Appl. No.: 55,569

[22] Filed: Jul. 9, 1979

Related U.S. Application Data

[63] Continuation-in-part of Ser. No. 22,910, Mar. 22, 1979, and a continuation-in-part of Ser. No. 22,914, Mar. 22, 1979, said Ser. No. 22,910, and Ser. No. 22,914, is a continuation-in-part of Ser. No. 891,437, Mar. 29, 1978, Pat. No. 4,160,732, and a continuation-in-part of Ser. No. 909,587, May 25, 1978, Pat. No. 4,193,206, which is a continuation-in-part of Ser. No. 775,673, Mar. 8, 1977, Pat. No. 4,128,946, Ser. No. 813,577, Jul. 7, 1977, Pat. No. 4,098,006, Ser. No. 813,578, Jul. 7, 1977, Pat. No. 4,099,336, Ser. No. 844,097, Oct. 20, 1977, Pat. No. 4,121,349, Ser. No. 858,879, Dec. 8, 1977, and Ser. No. 891,437, , which is a continuation-in-part of Ser. No. 813,577, , Pat. No. 4,098,006, said Ser. No. 858,879, is a continuation-in-part of Ser. No. 813,577, , and Ser. No. 813,578, , said Ser. No. 844,097, is a continuation-in-part of Ser. No. 813,578, , said Ser. No. 813,578, and Ser. No. 813,577, is a continuation-in-part of Ser. No. 775,673.

[51] Int. Cl.³ .......................... A47J 19/02; B30B 9/02
[52] U.S. Cl. .......................................... 100/37; 34/12; 34/14; 100/41
[58] Field of Search .................. 34/12, 14; 100/37, 41, 100/116, 126

[56] References Cited

U.S. PATENT DOCUMENTS

| | | | |
|---|---|---|---|
| 4,036,359 | 7/1937 | Stricklaud, Jr. | 100/37 |
| 4,160,732 | 7/1979 | Maffet | 100/37 |

Primary Examiner—John J. Camby
Attorney, Agent, or Firm—James R. Hoatson, Jr.; John F. Spears, Jr.; William H. Page II

[57] ABSTRACT

Sewage sludge is dewatered in a two-stage process. The first stage dewaters the sludge to a solids content above about 40 to 45 wt. %. The first zone comprises a cylindrical porous chamber with a centrally mounted screw conveyor which does not contact the porous wall of the chamber. The second stage further dewaters the sludge. The second stage applies pressure directly, as with a piston, to a stationary quantity of sludge which is in contact with a porous wall. The effectiveness of the second stage is increased through use of the first stage, which reduces the thixotropic nature of the sludge by dewatering it.

11 Claims, 3 Drawing Figures

TWO-STAGE MECHANICAL DEWATERING OF SEWAGE SLUDGE

CROSS-REFERENCE TO RELATED APPLICATIONS

This application is a Continuation-In-Part of my prior applications Ser. No. 22,910 filed Mar. 22, 1979 and Ser. No. 22,914 also filed Mar. 22, 1979.

Applications Ser. No. 22,910 and Ser. No. 22,914 are Continuations-In-Part of my prior applications Ser. No. 891,437 filed Mar. 29, 1978 now, U.S. Pat. No. 4,160,732 and Ser. No. 909,587 filed May 25, 1978, now U.S. Pat. No. 4,193,206.

Application Ser. No. 909,587 is a Continuation-In-Part of my copending applications Ser. No. 775,673 filed Mar. 8, 1977, now U.S. Pat. No. 4,128,946; Ser. No. 813,577 filed July 7, 1977, now U.S. Pat. No. 4,098,006; Ser. No. 813,578 filed July 7, 1977, now U.S. Pat. No. 4,099,336; Ser. No. 844,097 filed Oct. 20, 1977, now U.S. Pat. No. 4,121,349 Ser. No. 858,879 filed Dec. 8, 1977 and Ser. No. 891,437.

Application Ser. No. 891,437 is a Continuation-In-Part of application Ser. No. 813,577, now U.S. Pat. No. 4,098,006.

Application Ser. No. 858,879 is a Continuation-In-Part of applications Ser. No. 813,577 and 813,578, now U.S. Pat. No. 4,099,336.

Application Ser. No. 844,097 is a Continuation-In-Part of application Ser. No. 813,578.

Applications Ser. No. 813,578 and 813,577 are Continuations-In-Part of application Ser. No. 775,673, now U.S. Pat. No. 4,128,946.

The entire teaching of my prior applications and patents is hereby expressly incorporated by reference.

FIELD OF THE INVENTION

The invention relates to a process for mechanically dewatering an organic waste such as sewage sludge. The invention is directly related to a process for dewatering a primary or secondary sewage sludge or a mixture of these sludges which utilizes two different types of mechanical dewatering zones in sequence. The invention therefore relates to the filtration or separation of water from moist solids or semi-solid mixtures. Apparatus and methods of a similar nature are described in U.S. Patents classified in Classes 100 and 210.

PRIOR ART

The need to dispose of the large amounts of sewage sludge which are produced annually has prompted several attempts to develop economic methods of drying sewage sludge. Increasingly stringent environmental standards on the allowable discharge of sewage into rivers and landfills have also acted as a stimulus to the development of such methods. The possibility that the sludge may be useful as a fuel or a fuel supplement is another factor which prompted efforts to dewater or dry the sludge. One well known method is that utilized in metropolitan Milwaukee, Wis. to dry municipal sewage sludge and thereby produce an organic plant food called Milorganite. It is believed that the sludge is dried by the use of large rotating kilns through which hot vapors are passed. A different system in which a flash dryer is used is in operation in Houston, Texas. It is therefore well known in the art to dry sewage sludge by contact with hot vapors.

The use of a toroidal evaporative drying zone is well described in the literature. It is described for instance in U.S. Pat. Nos. 3,329,418 (Cl. 263-21); 3,339,286 (Cl. 34-10); 3,403,451 (Cl. 34-10); 3,546,784; 3,550,921 (Cl. 263-53); 3,648,936; 3,667,131; 3,856,215 (Cl. 241-39); 3,922,796; 3,927,479; 3,945,130; 3,958,342 and 3,974,574. The use of such a dryer in a process for the treatment of organic waste is taught in U.S. Pat. No. 3,802,089 (Cl. 34-8). This reference also discloses the use of a mechanical dewatering unit to remove water from organic waste prior to its injection into an evaporative drying zone. The teaching of this reference is, however, limited to the use of a centrifuge or a vacuum filter or a combination of the two.

It has long been recognized that it would be advantageous to mechanically remove water from various wastes and by-product sludges such as sewage sludge. In the specific case of sewage sludge, mechanical dewatering would reduce the amount of material to be disposed or transported, or the amount of material to be evaporated during various drying steps, as in the production of solid fertilizers or soil conditioners. Many different types of dewatering apparatus have been developed, but none is believed to have gained widespread usage and acceptance. Both the difficulties encountered in mechanically dewatering sewage sludge and a process for compacting the dried sludge into fertilizer pellets are described in U.S. Pat. No. 2,977,214 (Cl. 71-64).

One specific type of mechanical dewatering apparatus comprises a continuous filter belt which is slowly pulled through solids collection and removal areas. The device presented in U.S. Pat. No. 2,097,529 (Cl. 210-396) is of this type and may be used to dewater sewage sludge. Other sludge dewatering machines utilizing a moving filter belt are shown in U.S. Pat. Nos. 4,008,158 (Cl. 210-386); 4,019,431 (Cl. 100-37); 4,019,984 (Cl. 210-66); 4,066,548 (Cl. 210-160); 4,085,887 (Cl. 233-7) and 4,101,400 (Cl. 204-180R). A belt or conveyor-type sewage sludge dewatering device is also shown in U.S. Pat. No. 3,984,329 (Cl. 210-396). This reference is pertinent for its teaching of the benefits obtained by breaking up the layer of solid material which forms on the perforated conveyor belt. These benefits include aiding the water in reaching the belt and a tendency to prevent the plugging of the openings in the belt.

U.S. Pat. Nos. 3,695,173 (Cl. 100-74) 3,938,434 (Cl. 100-117) and 4,041,854 (Cl. 100-112) are pertinent for their presentation of apparatus for dewatering sewage sludge in which a helical screw conveyor is rotated within a cylindrical and frusto-conical dewatering chamber having perforate walls. These references all describe apparatus in which the outer edge of the screw conveyor scrapes the inner surface of the perforated cylindrical wall. The inventions presented include specific coil spring wiping blades, slot cleaning blades or brushes attached to the outer edge of the helical blade for continuous contact with the inner surface of the perforate wall, thereby cleaning solids therefrom. The two latest patents in this group are also relevant for their teaching of an alternate embodiment in which the terminal cylindrical portion of the screw conveyor blade does not closely follow the inner surface of the perforate wall but instead has a diameter approximately one-half the diameter of the dewatered solids output opening.

The first stage mechanical dewatering zone of the subject process is distinguishable from this grouping of patents by several points including the provision of a definite annular space between the outer edge of the screw conveyor blade and the inner surface of the perforate wall. This annular space preferably begins at the first end of the screw conveyor, where the feed first contacts the conveyor, and continues for the entire length of the porous wall and of the screw conveyor to the outlet of the apparatus. A layer of mechanically unagitated fiber derived from the entering sewage sludge is retained within this annular space as part of a dewatering process. A second distinguishing feature is the smaller spacing between the parallel windings of the perforated cylindrical wall used in the first stage mechanical dewatering system.

Other references which utilize a rotating conveyor or auger within a perforated outer barrel are U.S. Pat. Nos. 1,772,262 issued to J. J. Naugle; 3,997,441 to L. F. Pamplin, Jr.; and 1,151,186 to J. Johnson. These references illustrate the use of a precoat layer located in a space between the conveyor and the inner surface of the barrel as an aid to filtration. The Naugle patent discloses that the precoat layer or filter media may be formed from solids present in a liquid to be filtered. However, these references, and particularly the Naugle patent, are directed to the filtration of such materials as sugar juices, suspensions of clays, chalks, and the like rather than fibrous sewage sludge processed in the subject invention. These references also do not teach the specific mechanical limitations and arrangements. employed herein to successfully dewater the sewage sludge.

BRIEF SUMMARY OF THE INVENTION

The invention provides a simple, economical and efficient process for mechanically dewatering sewage sludge which is capable of producing a product stream containing over 60 wt.% solids. The process utilizes two different types of dewatering equipment in sequence. In the first stage, the sludge is transported and dewatered within a cylindrical porous wall which surrounds but does not contact a rotating helical conveyor blade. The effluent of this first dewatering zone is passed into a second dewatering zone in which the sludge is compressed against a porous surface resulting in further dewatering. The second dewatering zone operates at a higher pressure and the sludge is substantially immobile relative to the porous surface of the second zone. The inventive concept resides in the discovery that by increasing the solids content, the first dewatering zone reduces or eliminates the thixotropic character of the feed sludge, thereby allowing the partially dewatered sludge to be further dewatered in a direct pressure apparatus.

One embodiment of the invention may be broadly characterized as a process for mechanically dewatering sewage sludge which comprises the steps of passing a feed stream comprising sewage sludge which comprises at least 65 wt.% water into a first end of a first mechanical dewatering zone comprising a cylindrical chamber having a cylindrical porous wall formed by parallel windings which are spaced apart by a distance of about 0.0075 to about 0.013 cm., pressurizing the feed stream within the first dewatering zone to a superatmospheric pressure by rotating a screw conveyor having a helical blade which begins at the first end of the first dewatering zone and which is centrally mounted within the porous wall, the blade of the screw conveyor having a helical outer edge which is separated from the inner surface of the porous wall by a distance of from about 0.08 to about 5.0 cm.; maintaining a substantially continuous and unagitated layer of filter media comprising fibers derived from the feed stream in an annular space located between the inner surface of the porous wall and the helical outer edge of the screw conveyor, and simultaneously transporting the sewage sludge located between the grooves of the helical blade of the screw conveyor along the length of the porous wall to a second end of the first dewatering zone; withdrawing water radially from the first dewatering zone through the porous wall and through said layer of filter media; withdrawing a first dewatering zone solids stream comprising at least 35 wt.% solids from the second end of the first dewatering zone; passing the first dewatering zone solids stream into a second mechanical dewatering zone and compressing the first dewatering zone solids stream by applying a pressure in excess of 500 psi., with this pressure being applied while the first dewatering zone solids stream is in contact with a porous surface and while the first dewatering zone solids stream is substantially immobile relative to said porous surface, and thereby removing water from the first dewatering zone solids stream; and withdrawing a second dewatering zone solids stream comprising at least 45 wt.% solids from the second mechanical dewatering zone.

DESCRIPTION OF THE DRAWING

Referring now to FIG. 1, a feed stream comprising the sewage sludge to be dewatered enters the apparatus through an inlet throat 1 and is directed downward to the first end of a dewatering zone where it makes contact with a screw conveyor having a helical blade 4. The shaft 2 of the screw conveyor extends out of the cylindrical chamber surrounding the dewatering zone through a seal and bearing 5 and is connected to a drive means not shown which rotates the screw conveyor. The rotation of the screw conveyor pressurizes the sewage sludge by pushing it toward the second end of the dewatering zone and against the cylindrical porous wall 3 which encircles the screw conveyor. The outer end of the conveyor is supported by a bearing 7 at the center of a spider or cross-member 6. The spider is in turn held in place by a threaded cap 8 having an opening 12 at the second end of the dewatering zone. The outer end of the arms of the spider are retained between a raised lip 13 on the inner surface of the chamber and the cap.

Fibrous material from the entering feed stream accumulates in an annular space between the outer edge of the screw conveyor and the inner surface of the porous wall. Water is expressed radially through this built-up layer of fiber and through the porous wall. The water is directed into a basin 10 by a shroud 9 which surrounds the upper portions of the porous wall and is then drawn off through line 11.

Figure 2:
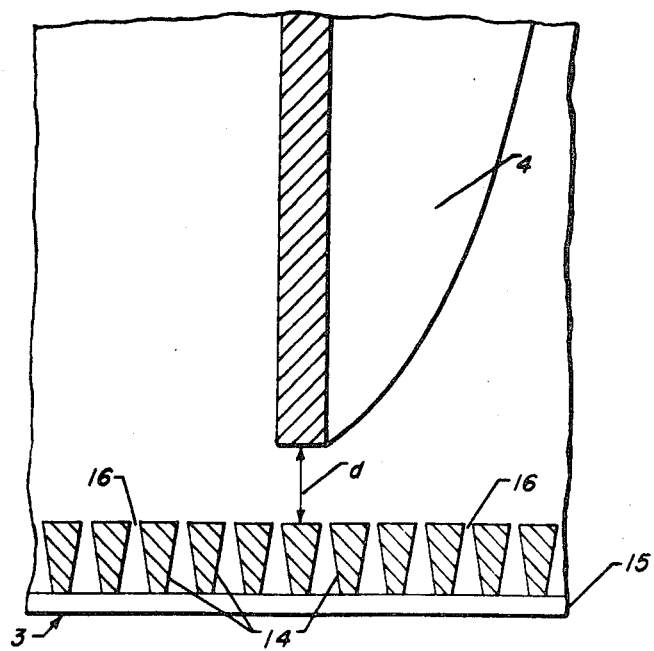
FIG. 2 is an enlarged cross-sectional view of a small portion of the helical screw conveyor blade and porous wall shown in FIG. 1.

The preferred construction of the cylindrical porous wall 3 is shown in detail in FIG. 2. The wall is formed by parallel spiral windings of tapered wire 14 which are welded to several connecting rods 15 at the smaller outer edge of each winding. The connecting rods are in alignment with the central axis of the cylinder formed by the wall. The broader edge of each winding faces inward toward the blade 4 of the screw conveyor, with each winding being separated by a uniform space 16 through which water may pass. The inner surface of the porous wall is separated from the helical outer edge of the blade 4 by preferably constant distance "d".

Figure 3:
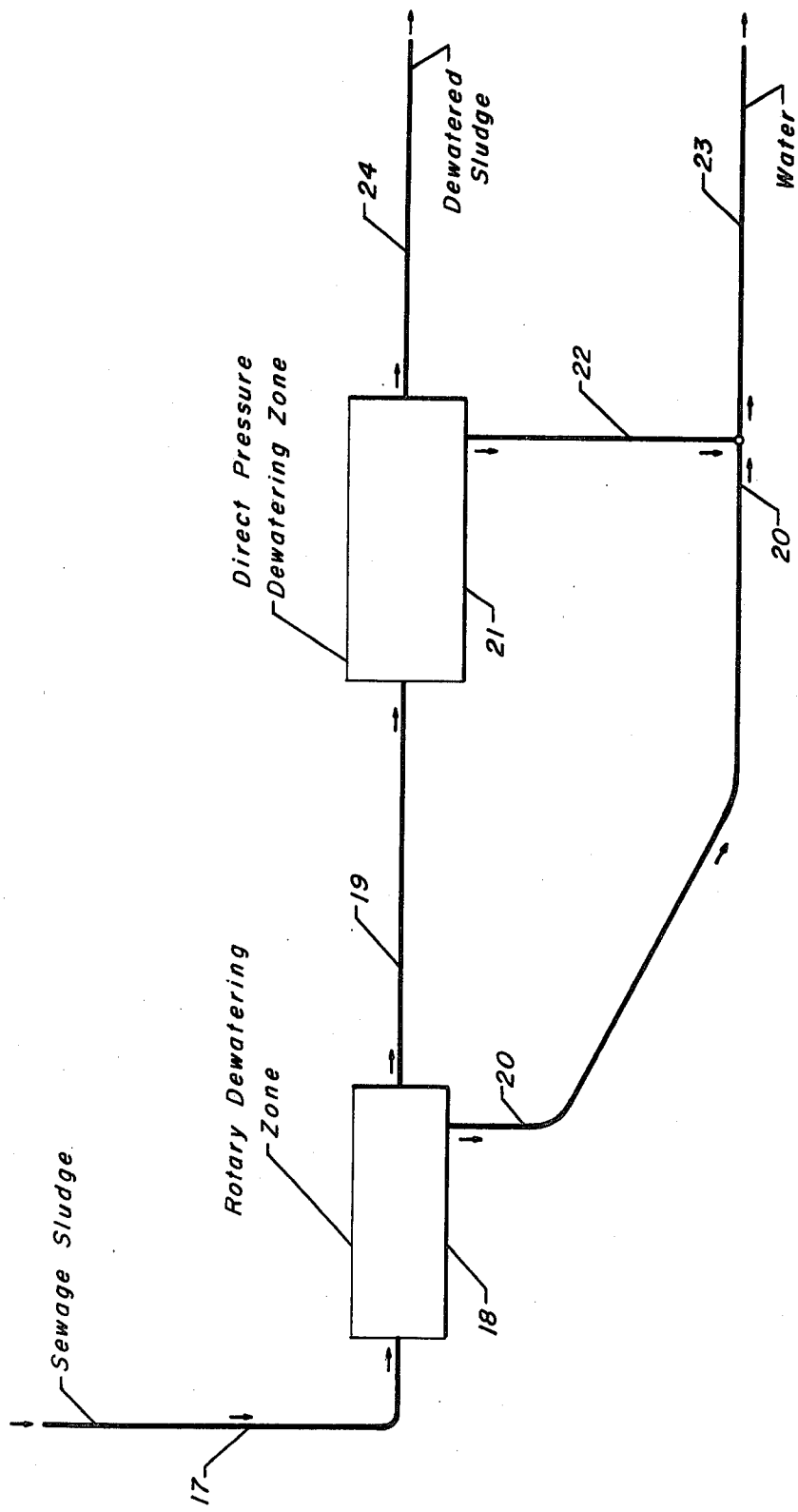
FIG. 3 is a flow diagram of the subject process.

Referring now to FIG. 3, a feed stream comprising primary sewage sludge having a nominal solids content of about 20 wt.% enters the process through line 17. This feed stream enters a rotary dewatering zone 18 comprising an apparatus similar to that presented in FIGS. 1 and 2. The feed stream is dewatered within this first zone, resulting in a water stream carried by line 20 and a first dewatering zone solids stream carried by line 19. The first dewatering zone solids stream contains between 35 to about 45 wt.% solids and is passed into a direct pressure dewatering zone 21. The first dewatering zone solids stream is compressed against a porous surface in this second dewatering, causing water to pass through the porous surface into line 22. The water flowing through lines 20 and 22 is combined and withdrawn from the process in line 23. A second dewatering zone solids stream which normally contains between about 55 to about 65 wt.% solids is removed from the process in line 24.

These drawings are presented to ensure a clear understanding of the inventive concept and are not intended to exclude from the scope of the invention those other embodiments set out herein or which are the result of normal and reasonable modification of those embodiments.

DETAILED DESCRIPTION

The combined pressure of higher disposal costs and more rigid environmental protection laws has continued to make the utilization of sewage sludge as a revenue-producing material increasingly attractive. Considerable attention has therefore been given to converting the sludge into a fertilizer or soil conditioner. This use of the sludge as fertilizer has proven to be economically unattractive in most instances and may have pollution problems associated with it. The major emphasis in sludge utilization at this time is therefore shifting to the use of the sludge as a combustible fuel.

Most municipal sewage sludges have a final solids content of about 20—22 wt.%. The large amount of water in these sludges makes it impractical to use the sludge as a fuel. The partial removal of the entrained water is therefore necessary to produce a useful combustion-sustaining fuel. Dewatering the sludge may also prove beneficial by reducing odors, limiting liquid runoff, reducing the weight of sludge which is to be transported, recovering water for reuse and by placing the sludge in better condition for subsequent processing.

Water can be driven off sewage sludge by the direct or indirect application of heat. Several systems including those previously referred to employ this technique to dry sludge. However, thermal drying requires the consumption of increasingly expensive fuels and leads to its own problems, including flue as and vapor stream discharges. It is therefore very desirable to mechanically dewater sewage sludge to the maximum extent possible and feasible and to utilize thermal drying only as a final drying or sterilization step. It is believed that this need for an efficient method of mechanically dewatering sewage sludge has not been filled by any presently commercial dewatering system.

It is an objective of the subject invention to provide a process for mechanically dewatering sewage sludge. It is another objective to provide a process which allows sewage sludge to be further dewatered by the direct application of pressure in a filtration chamber. Another objective of the invention is to provide a process for mechanically dewatering sewage sludge to a solids content greater than about 60 wt.%.

The subject invention is directed to the dewatering of sludge. As used herein, the term "dewatering" refers to the removal of water from the sludge by means other than evaporation. Any evaporation which occurs during the process is only incidental to handling and processing of the sludge. An evaporative drying process may be used after the subject dewatering process as a finishing step.

Figure 1:
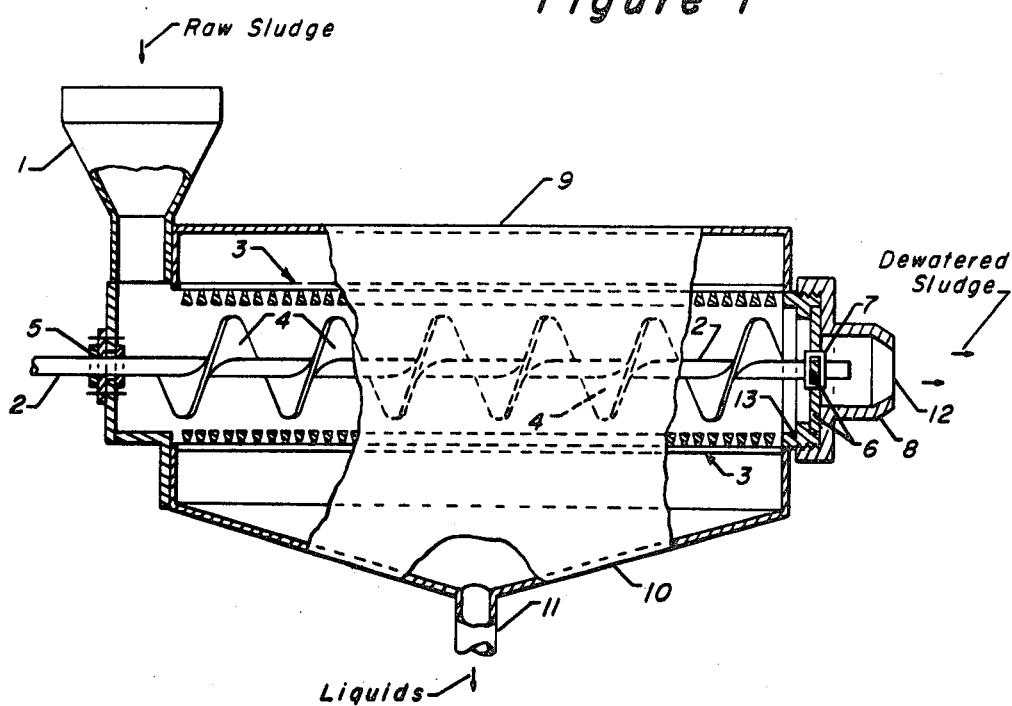
FIG. 1 is a cross-sectional view along a vertical plane of an apparatus which may be used as the first dewatering zone of the subject process.

The process of the subject invention is carried out in two separate stages. These two stages are performed in two zones which utilize different types of apparatus. The first stage is performed in what is referred to herein as a "rotary dewatering zone". In this zone, the sludge is dewatered through the use of an apparatus which comprises a rotating conveyor blade located within a cylindrical porous wall. This type of apparatus is shown in FIGS. 1 and 2. The solids content of the sludge is increased from about 20 wt.% to about 40 to 45 wt.% in the rotary dewatering zone.

The sludge which has been processed in the rotary dewatering zone is then passed into what is referred to herein as a "direct pressure dewatering zone". In this second stage of the process, the partially dewatered sludge is subjected to a direct pressure by compression against one or more porous surfaces. The apparatus used in the second stage may therefore be one of the prior art types of apparatus. One example is the continuous filter belt type of apparatus in which the sludge is squeezed against the belt by a second belt or by a series of rollers or panels. A second example of the apparatus which may be used in the second stage is a piston and cylinder-type of mechanism in which the sludge is compressed within a porous-walled cylinder by the movement of the piston toward an opposing sealed end of the cylinder.

The apparatus used in the second stage of the process may therefore vary widely in its structure and method of operation. The apparatus of the second stage may however be characterized by two features which distinguish it from that used in the first stage. First, the sludge is normally maintained as a single mass or layer, at least some of which is substantially immobile relative to the porous surface(s) which it is in contact with. That is, except for the movement induced by the pressure applied to the sludge, the sludge does not move along the porous surface but remains in contact with one point on this surface. This is especially true of the continuous belt-type of apparatus. In an apparatus of the piston and cylinder type, the sludge adjacent the piston will move as the sludge is pressurized and compressed. There is, therefore, some movement of this sludge, but the amount of movement decreases and reaches zero at the end of the cylinder which opposes the piston.

A second distinguishing feature of the direct pressure dewatering zone is the higher pressure which is employed within this zone. The pressure employed should be above 500 psi. and prefereably is above 1,000 psi. More preferably, the pressure is above 1,500 psi. This is in sharp contrast to the lower pressures preferred in the rotary dewatering zone. It has been determined that the openings between the parallel windings or parallel bars of the porous surface used in the direct pressure dewatering zone need not be as small as those in the rotary dewatering zone. The preferred "self-cleaning" slot-type openings may be from about 0.01 to about 0.015 inches wide (0.025 to 0.038 cm.). The porous surface used in the direct pressure dewatering zone may be flat or curved.

The use of continuous filter belt (conveyor) filter presses in the second dewatering stage has the advantage of an inherently continuous mode of operation. However, this type of apparatus may have difficulty in applying the desired elevated pressures and in withstanding long periods of use at these high pressures. It is therefore preferred that a piston and cylinder press is employed in the second dewatering stage. Apparatus of this general nature is available commercially for use as presses, extractors and balers. The preferred apparatus for use in the second stage comprises a porous outer cylinder similar in nature to that shown in FIGS. 1 and 2 and described in more detail below. The cylinder is therefore preferably formed from parallel windings held in place by longitudinal connecting rods.

After a quantity of sludge is placed within the cylinder, the piston is inserted into an open first end of the cylinder and then moved toward the opposing second closed end of the cylinder. The piston and the closure at the second end of the cylinder may be perforated to allow the escape of water. The piston is preferably moved through the use of a hydraulic ram. The closure is preferably of a movable nature which allows the use of the piston to discharge the dewatered sludge. The movement of the piston compresses the sludge, thereby forcing water outward through the porous cylinder. The thus-dewatered sludge is then removed from the cylinder and the steps are repeated.

It is believed that virtually any type of apparatus which can apply the required pressure and which freely allows the escape of the expressed water through properly sized openings may be employed in the direct pressure dewatering zone. The pressure may be applied by means other than a piston including a movable wall or inflatable bladder. The chamber in which the sludge is pressurized need not be cylindrical and may be rectangular. A large number of similar pieces of apparatus may be used in the direct pressure dewatering zone to achieve the desired capacity.

One or more pieces of similar apparatus may also be employed in the rotary dewatering zone. Each of these apparatus preferably comprises a porous cylindrical chamber having a first end which is sealed except for an inlet conduit and an opening for a rotating drive shaft and a second end having an opening for the discharge of the dewatered sludge. The terminal portions of the chamber located adjacent to the central porous section of the chamber are preferably imperforate to provide greater structural strength. The chamber should have a length to inside diameter ratio above 2:1 and preferably from about 4:1 to about 20:1. The inside diameter of this chamber is preferably uniform along the length of the chamber. The cylindrical chamber of the subject dewatering zone corresponds in several ways to the barrel of a typical extruder. A major portion of the distance between the ends of the chamber is devoted to providing a porous outer wall through which water is expressed. This porous wall is to be cylindrical and preferably has the same inside diameter as the rest of the chamber, with the exception that a raised lip may be present at the second end of the chamber to aid in positioning equipment located at the end of the chamber.

The porous wall is preferably fashioned from a continuous length of wedge-shaped bar which is welded to several connecting members running along the length of the porous wall as shown in the drawing. This construction provides a continuous spiral opening having a self-cleaning shape. That is, the smallest opening between two adjacent parallel windings is at the inner surface of the porous wall, thereby providing a continuously widening space which allows any particle passing through the opening to continue outward. The outward movement of these particles is aided by the radially flowing water. Wedge-shaped wound screens of the desired type are available commercially and are used as well screens and to confine particulate material within hydrocarbon conversion reactors. Other types of porous wall construction meeting the criteria set out herein may also be used.

The distance between adjacent windings, or the equivalent structure of other screen materials, used in the porous wall should be within the range of from about 0.0075 to about 0.013 cm. (or about 0.003 to 0.005 inches). This distance is smaller than that specified in the previously referred to Cox U. S. Patents, which is 0.006 inches in U.S. Pat No. 3,695,173 and 0.008 inches in U.S. Pat. No. 3,938,434. The subject process is therefore performed in an apparatus having a considerably smaller opening than called for by the prior art.

A screw conveyor having a helical blade is centrally mounted within the cylindrical chamber. The major central axis of this conveyor is preferably coextensive with the major axis of the cylindrical chamber and the porous cylindrical wall. The chamber and porous wall are therefore concentric about the screw conveyor. It is critical to the proper performance of the process that the outer edge of the blade of the screw conveyor be spaced apart from the inner surface of the porous wall by a distance greater than about 0.08 cm. but less than about 5.0 cm. Preferably, the outer edge of the screw conveyor is at least 0.2 cm. but less than 2.0 cm. from the inner surface of the porous wall. It is especially preferred that a minimum distance of 0.44 cm. is provided between the outer edge of the screw conveyor and the porous wall. This distance should be substantially uniform along the distance the two elements are in juxtaposition.

The purpose of this separation between the screw conveyor and the wall is to provide a relatively unagitated layer of fibrous filter media on the inner surface of the porous wall. This filter media has an annular shape conforming to the inner surface of the porous wall and the cylinder swept by the outer edge of the screw conveyor. The term "unagitated" is intended to indicate that this filter bed is not mixed or sliced by any mechanical element extending toward the porous wall from the blade. This arrangement is contrasted to the previously referred to extrusion press apparatus in which the surface of the porous wall is "scraped" by the screw conveyor and blades or brushes are attached to the blade to clean the openings in the porous wall.

Although it is free of mechanical agitation, the annular layer of filter media covering the inner surface of the dewatering zone will not be stagnant and undisturbed since it will be subjected to the stress and abrasion which result from the rotation of the screw conveyor. The associated shear stress will extend radially outward through the filter bed to the porous wall, thereby exerting a torque on the entire bed and causing some admixture of the filter media. This torque will most probably cause the annular layer of filter media to rotate with the screw conveyor. It is theorized that the filter media may be self-cleaning because of the continuous movement occurring along both of its surfaces. This action may explain the superior performance of the subject invention as compared to conventional processes in which the interface between a filter belt and accumulated material is essentially static.

The screw conveyor is rotated to move the sludge being dewatered to the outlet of the dewatering zone, pressurizing the material within the dewatering zone and thereby causing water to flow radially through the layer of filter media and the porous wall. The screw conveyor may be rotated at from about 10 to about 150 rpm, or even more rapidly if desired. However, it is preferred to operate the dewatering zone with the screw conveyor rotating at from 20 to 60 rpm. Only a moderate superatmospheric pressure is required within the dewatering zone. A pressure of less than 500 psig. is sufficient, with the pressure preferably being less than 100 psig. The process may be operated at ambient temperatures, with temperatures below 32° C. being preferred when most organic wastes including raw sewage sludge are to be dewatered. It is therefore not normally necessary to provide either heating or cooling elements along the length of the dewatering zone. However, it has recently been discovered that heat should be applied during the dewatering of a secondary sludge. The heat may be applied by a heater having a surface above 149° C. which is in contact with the upper surface of the porous wall and should heat the sludge to an average temperature above 60° C.

The screw conveyor should have a length to diameter ratio above 2:1 and preferably in the range of from 4:1 to about 20:1. A unitary one-piece screw conveyor is preferred. The design of the screw conveyor is subject to much variation. The pitch or helix angle of the blade need not change along the length of the screw conveyor. However, constant pitch is not critical to successful performance of the process, and the pitch may be varied if so desired. Another common variable is the compression ratio of the screw conveyor or auger. The compression ratio refers to the change in the flight depth along the length of the screw conveyor, with the flight depth being measured from the surface of the shaft of the screw conveyor to the outer edge of the helical blade. As used herein, a 10:1 compression ratio is intended to specify that the flight depth at the terminal portion of the screw conveyor is one-tenth as great as the flight depth at the initial or feed receiving portion of the screw conveyor. The compression ratio of the screw conveyor is preferably below 15:1 and more preferably is in the range of from 1:1 to 10:1. Suitable screw conveyors, drive components and reduction gears are readily available from firms supplying these items for use in the extrusion of plastics, etc.

The feed stream charged to the subject process should contain at least 65 wt.% water. It preferably contains at least 75 wt.% water and may contain up to 90 wt.% or more. The typical municipal sludge will contain about 20 to 22 wt.% solids. The feed stream may be composed of just primary sewage sludge. Alternatively, it may be a mixture of primary and secondary sludges or the feed stream may contain just a secondary sludge. The first dewatering zone solids stream may contain from about 35 to about 50 wt. % solids. It is preferred that this stream contains at least 40 wt.% solids, and more preferably at least 45 wt.% solids. It is also preferred that the second dewatering zone solids stream contains at least 55 wt.% solids.

The subject process is a two-stage or two-step process. In order to achieve the highly successful results of the process, these steps must be performed in the order described and not reversed. The rotary dewatering zone easily and quickly dewaters the sewage sludge of the feed stream and produces an effluent which is not thixotropic. The rotary dewatering zone therefore allows the sludge to be further dewatered in the simpler direct pressure dewatering zone and eliminates the need to continue dewatering the sludge in a rotary dewatering zone. This is a large advantage since, although it is possible to reach very high solids concentrations in a rotary dewatering zone, continued dewatering requires the use of a very heavy duty apparatus and places a great torque on the conveyor and porous cylinder. The subject process therefore produces a synergistic effect by allowing each type of dewatering zone to be utilized in a much more efficient and effective manner.

The effectiveness of the subject process is demonstrated by the following example. Raw primary sludge from Jersey City, N.J. was dewatered in a rotary dewatering zone corresponding to the preferred apparatus described above. The resultant partially dewatered sludge contained about 50 wt.% solids. A quantity of the partially dewatered sludge was then placed in a porous cylinder similar in nature to those preferred for use in the rotary dewatering zone except that the openings were between 0.012 and 0.015 inches (0.03 to 0.038 cm.). The sludge was then compressed at pressures ranging from 500 psi. to about 2,000 psi. This produced a series of second stage products having a solids contents ranging from 62 to 69 wt.% solids, with the higher solids contents being associated with the higher pressures. The cross-sectional area of the porous cylinder was 1.1 square inches.

In a second test, similar sludge from the same source was first dewatered to approximately 45 wt.% solids in the rotary dewatering zone. The sludge was then further dewatered in a square chamber made from flat pieces of the same type of welded screen used to form the porous cylinder of the first tests but having openings of about 0.01 inch (0.025 cm.). The chamber was four inches square and five inches high. The sludge was compressed by applying a pressure of about 3,000 psi. with a square piston designed to closely fit the inner surface of the chamber. The second stage dewatered sludge contained approximately 66 wt.% solids.

I claim as my invention:

1. A process for mechanically dewatering sewage sludge which comprises the steps of:
   (a) passing a feed stream comprising sewage sludge which comprises at least 65 wt.% water into a first end of a first mechanical dewatering zone comprising a cylindrical chamber having a cylindrical porous wall formed by parallel windings which are spaced apart by a distance of about 0.0075 to about 0.013 cm., pressurizing the feed stream within the first dewatering zone to a superatmospheric pressure by rotating a screw conveyor having a helical blade which is centrally mounted within the porous wall, the blade of the screw conveyor having a helical outer edge which is separated from the inner surface of the porous wall by a distance of from about 0.08 to about 5.0 cm.;

(b) maintaining a substantially continuous and unagitated layer of filter media comprising fibers derived from the feed stream in an annular space located between the inner surface of the porous wall and the helical outer edge of the screw conveyor, and simultaneously transporting the sewage sludge located between the grooves of the helical blade of the screw conveyor along the length of the porous wall to a second end of the first dewatering zone;

(c) withdrawing water radially from the first dewatering zone through the porous wall and through said layer of filter media;

(d) withdrawing a first dewatering zone solids stream comprising at least 35 wt.% solids from the second end of the first dewatering zone;

(e) passing the first dewatering zone solids stream into a second mechanical dewatering zone and compressing the first dewatering zone solids stream by applying a pressure in excess of 500 psi., said pressure being applied while the first dewatering zone solids stream is in contact with a porous surface and while the first de-watering zone solids stream is substantially immobile relative to said porous surface, and thereby removing water from the first dewatering zone solids stream; and, (f) withdrawing a second dewatering zone solids stream comprising at least 45 wt.% solids from the second mechanical dewatering zone.

2. The process of claim 1 further characterized in that the feed stream comprises primary sewage sludge.

3. The process of claim 1 further characterized in that the feed stream comprises at least 75 wt.% water.

4. The process of claim 3 further characterized in that the first dewatering zone solids stream comprises 40 wt.% solids.

5. The process of claim 4 further characterized in that the feed stream comprises primary sewage sludge.

6. The process of claim 5 further characterized in that the feed stream comprises secondary sewage sludge.

7. The process of claim 5 further characterized in that the second dewatering zone solids stream comprises at least 55 wt.% solids.

8. The process of claim 5 further characterized in that the helical outer edge of the screw conveyor is separated from the inner surface of the porous wall by a distance greater than 0.44 cm.

9. The process of claim 1 further characterized in that the porous surface of the second mechanical dewatering zone comprises parallel solid bars which are spaced apart at a distance of from about 0.025 to about 0.038 cm.

10. The process of claim 1 further characterized in that the helical outer edge of the screw conveyor is separated from the inner surface of the porous wall by a distance greater than 0.44 cm.

11. The process of claim 1 further characterized in that the feed stream comprises secondary sewage sludge.

* * * * *